Figure 1:
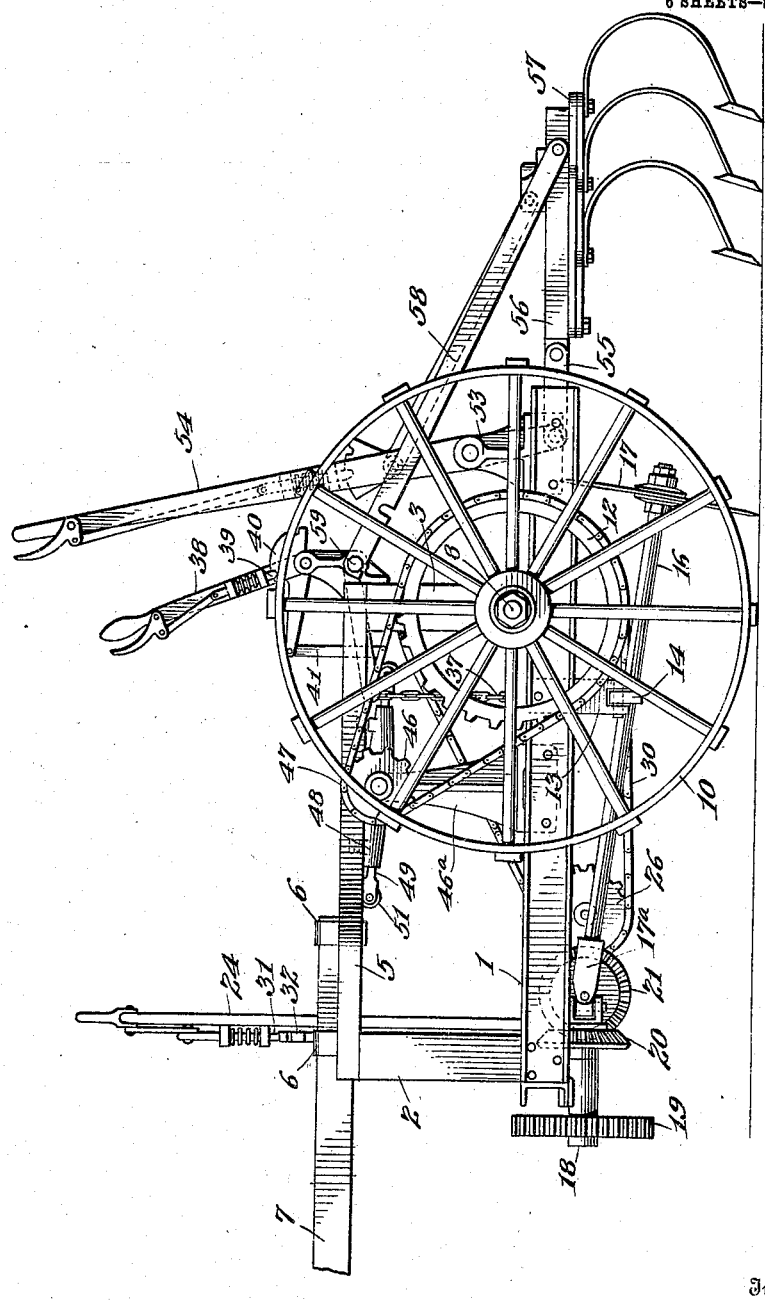

T. J. SMITH.
COTTON CHOPPER.
APPLICATION FILED DEC. 26, 1908.

924,286.

Patented June 8, 1909.
6 SHEETS—SHEET 1.

Witnesses
M. C. Lyddane
J. D. L. Mulhall.

Inventor
Taylor J. Smith
By Joshua R. H. Potts
Attorney

T. J. SMITH.
COTTON CHOPPER.
APPLICATION FILED DEC. 26, 1908.

924,286.

Patented June 8, 1909.
6 SHEETS—SHEET 3.

Witnesses
M. C. Lyddane
J. D. F. Mulhall

Inventor
Taylor J. Smith

By Joshua R. H. Potts

Attorney

T. J. SMITH.
COTTON CHOPPER.
APPLICATION FILED DEC. 26, 1908.

924,286.

Patented June 8, 1909.
6 SHEETS—SHEET 4.

Witnesses
M. C. Lyddane
J. O. L. Mulhall

Inventor
Taylor J. Smith
By Joshua R. N. Potts
Attorney

T. J. SMITH.
COTTON CHOPPER.
APPLICATION FILED DEC. 26, 1908.
924,286.
Patented June 8, 1909.
6 SHEETS—SHEET 5.
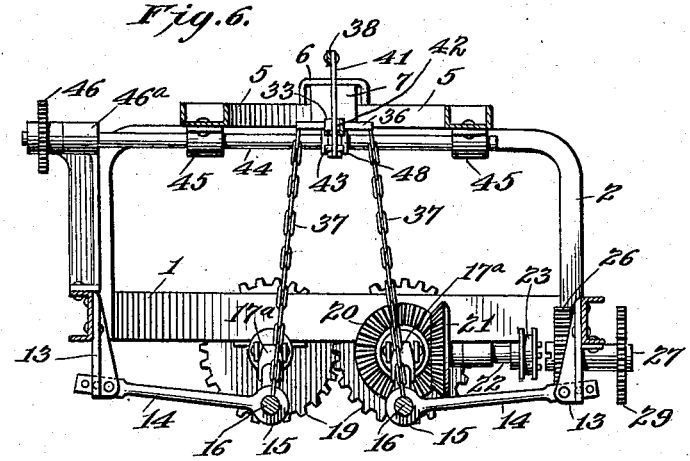
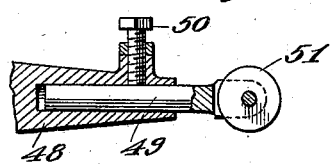
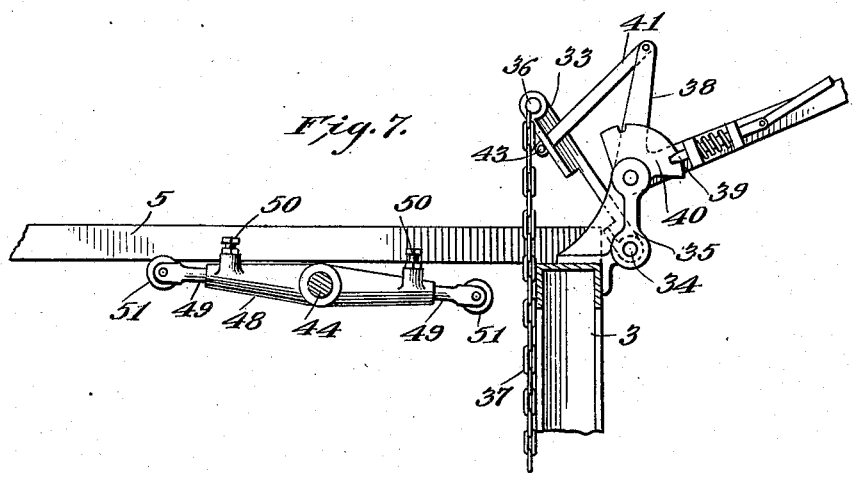
Inventor
Taylor J. Smith
Witnesses
M. C. Lyddane
J. D. F. Mulhall
By
Joshua R. H. Potts
Attorney

T. J. SMITH.
COTTON CHOPPER.
APPLICATION FILED DEC. 26, 1908.

924,286.

Patented June 8, 1909.
6 SHEETS—SHEET 6.

Witnesses
M. C. Lyddane
J. D. F. Mulhall.

Inventor
Taylor J. Smith
By Joshua R. H. Potts.
Attorney

THE NORRIS PETERS CO., WASHINGTON, D. C.

UNITED STATES PATENT OFFICE.

TAYLOR J. SMITH, OF BIRMINGHAM, ALABAMA.

COTTON-CHOPPER.

No. 924,286.  Specification of Letters Patent.  Patented June 8, 1909.

Application filed December 26, 1908. Serial No. 469,192.

*To all whom it may concern:*

Be it known that I, TAYLOR J. SMITH, a citizen of the United States, residing at Birmingham, in the county of Jefferson and State of Alabama, have invented certain new and useful Improvements in Cotton-Choppers, of which the following is a specification.

My invention relates to improvements in cotton choppers, and more particularly to improved means for chopping the cotton, together with improved cultivator construction, the latter covered in a separate application executed on even date herewith and given Serial No. 469,194.

An object of the invention is to provide improved overlapping rotary disks or colters which will chop out superfluous cotton and direct it to the side in the path of the cultivator teeth.

A further object is to provide improved tripping mechanism to elevate the disks at regular intervals, so as to chop out just the desired quantity of cotton.

A further object is to provide improved means for adjusting this tripping mechanism, so that the time of the lifting of the disks can be regulated, and the quantity of cotton chopped out can be regulated to suit conditions.

A further object is to provide improved means for elevating the disks or scrapers and holding them elevated to permit the machine to be turned at the end of a row, or to be transported from place to place.

A further object is to provide improved mounting for the choppers which permits the choppers to adjust themselves in accordance with uneven places in the ground.

A further object is to provide improved mounting for the disks, and improved means for rotating them in opposite directions, all of which are under the absolute control of the operator at all times.

A further object is to provide an improved construction of frame which is extremely strong and durable, and especially adapted for supporting my improved mechanism.

With these and other objects in view the invention consists in certain novel features of construction, and combinations, and arrangements of parts as will be more fully hereinafter described and pointed out in the claims.

Figure 2:
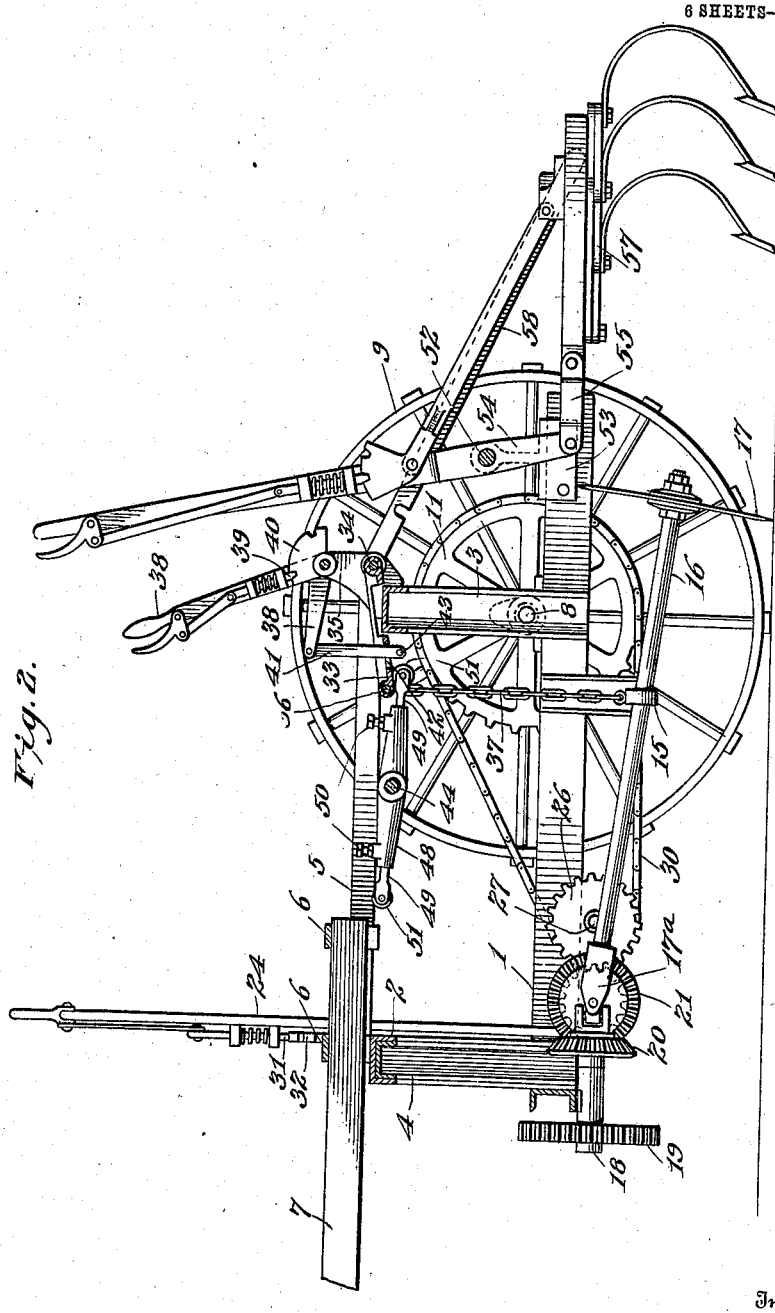
Figure 3:
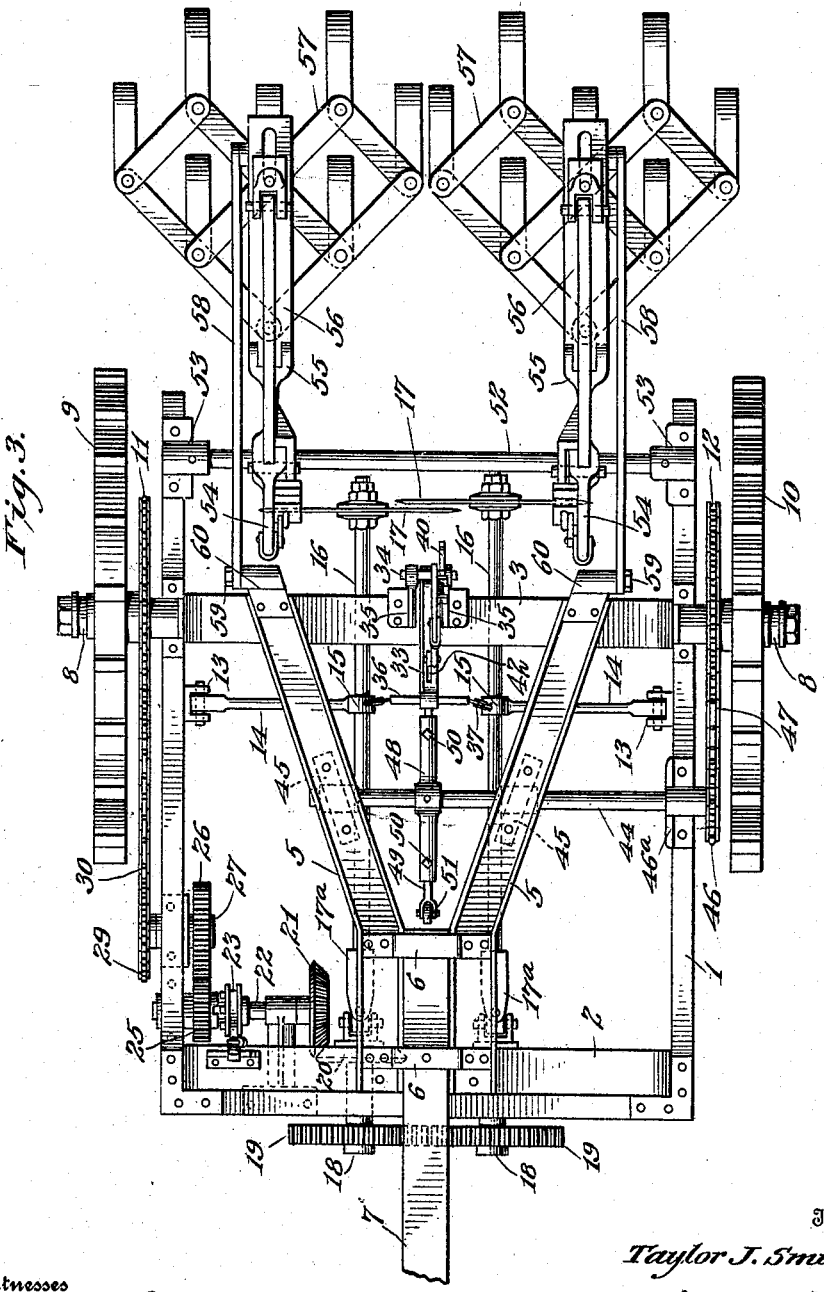
Figure 4:
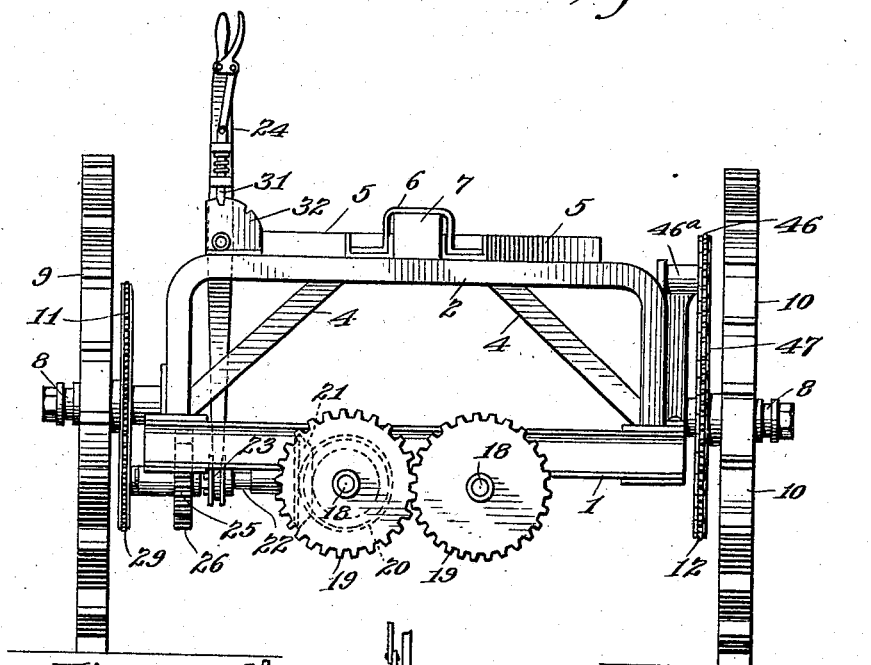
Figure 5:
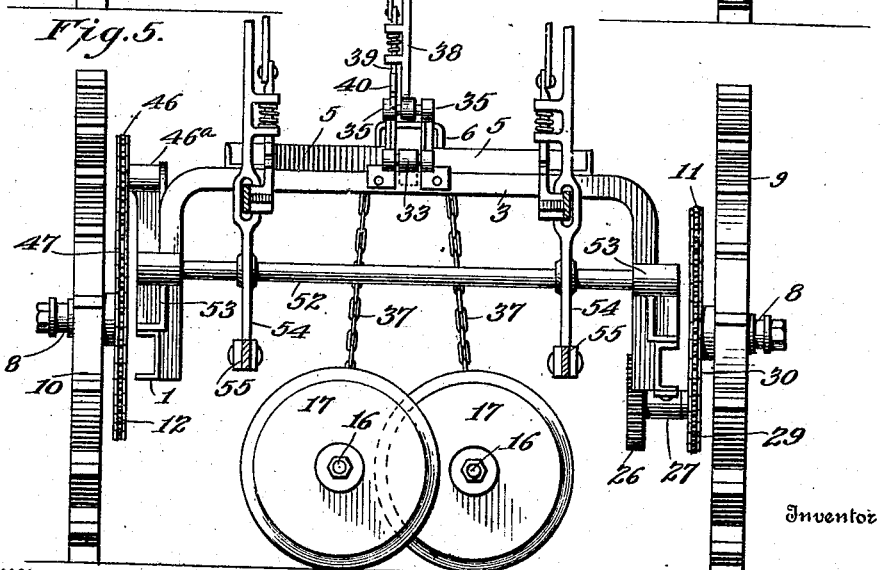
Figure 9:
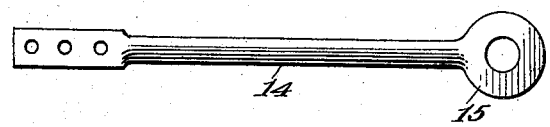
Figure 10:
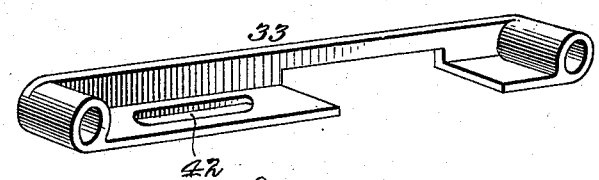
Figure 11:
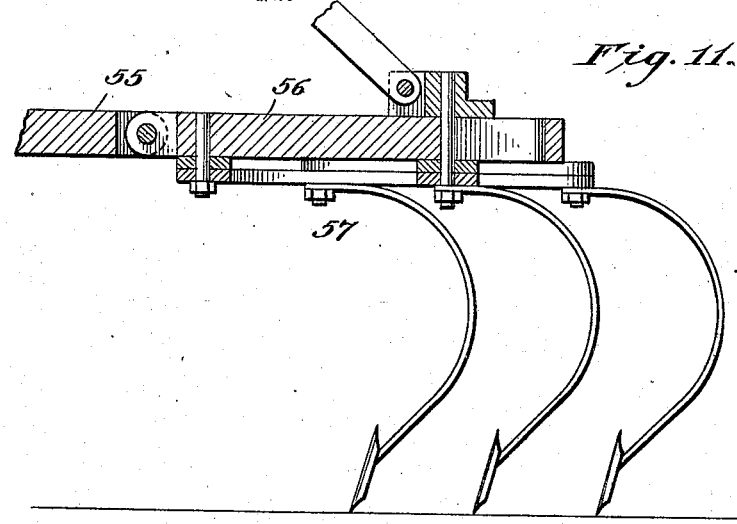

In the accompanying drawings, Figure 1, is a view in side elevation illustrating my improvements. Fig. 2, is a view in longitudinal section. Fig. 3, is a top plan view. Fig. 4, is a front end view with parts of the mechanism removed. Fig. 5, is a rear end view of the cotton chopper proper, leaving off the cultivators. Fig. 6, is a view in cross section illustrating the supports and rotary driving means of the choppers. Fig. 7, is an enlarged detail view in section of the driving mechanism. Fig. 8, is a view in section through one end of the tripping lever illustrating the manner of adjustment. Fig. 9, is a detail view of one of the chopper shaft hangers 14. Fig. 10, is a detail perspective view of the link 33, and Fig. 11, is a view in longitudinal section through a cultivator frame.

My improved frame which is composed of channel bars comprises a lower rectangular frame 1, connected by arches 2 and 3 respectively, both of said arches strengthened by diagonal braces 4 as clearly shown in Fig. 4. Longitudinal bars 5 are secured at their forward ends to the front arch 2, and extend rearward and parallel for a short distance and then diverge apart and are secured to the rear arch 3. Straps 6 connect these bars at their parallel portion and provide a mounting for the tongue 7.

Axle stubs 8 are secured to the rear arch 3, and are supported in traction wheels 9 and 10 respectively. Large sprocket wheels 11 and 12 respectively, are secured on the hubs of the wheels 9 and 10 respectively, and transmit motion to operate the machine as will more fully hereinafter appear.

Bifurcated brackets 13 are secured to the side bars 1 and depend therefrom, and arms or hangers 14 are provided with bearings 15 at their inner ends in which longitudinal shafts 16 are supported and mounted to turn. The outer ends of these arms or hangers 14 are provided with a series of openings so as to permit the adjustment of the hangers in the brackets 13 to position the shafts 16 and the disks or colters 17 carried thereby, to exactly suit conditions.

The forward ends of the shaft 16 are connected by universal joints 17ª with short shafts 18, the latter mounted in bearings secured to the bottom of the frame, and having intermeshing gear wheels 19 fixed thereon at their forward ends.

A beveled gear 20 is secured on one of the shafts 18 and is driven by a gear 21 on a laterally projecting shaft 22. This shaft 22 is provided with a sliding clutch 23 operated by a lever 24 to throw a pinion 25 into and out of locked engagement with the shaft 22 to start and stop the rotary movement of the shaft 16 and disks or colters 17. The pinion 25 is in mesh with a pinion 26, the latter fixed upon a short shaft 27 supported in a bearing on one side bar 1, and carrying a smaller sprocket wheel 29.

The sprocket wheel 29 and sprocket wheel 11 on the hub of wheel 9, are connected by an endless chain 30 to transmit motion as is well understood. The lever 24 for operating clutch 23, is provided with a spring-pressed detent 31 to engage a notched segment 32 on the frame and hold the lever and clutch in either of its positions.

A link 33 is pivotally supported at its rear end on a pin 34, the latter mounted in parallel brackets 35 secured upon the rear arch 3 at the center of the latter. This link 33 is notched or recessed as shown to permit its movement over the arch 3, and is provided at its forward end with a cross pin 36, which latter is connected, at its ends, by chains 37, with the bearings 15 at the inner ends of arms 14.

A bell-crank lever 38 is fulcrumed to one of the brackets 35 and is provided with a spring-pressed detent 39 to engage a fixed segment 40 and lock the lever. The shorter member of the lever 38 is provided with a depending link 41 extending downward through an opening 42 in link 33. The lower end of link 41 is provided with a cross pin 43 so that when the lever 38 is thrown backward, the pin 43 will engage under link 33 to elevate the link and the shafts 15, so as to lift the scrapers out of contact with the ground and permit the machine to be moved from place to place.

A transverse shaft 44 is supported in hangers 45 depending from bars 5, and is also supported in a standard 46ª projecting upward from one lower side bar 1. This shaft is provided at its outer end with a sprocket wheel 46, connected by an endless sprocket chain 47 with the sprocket wheel 12 on the hub of traction wheel 10, so that when the wheel 10 turns, the shaft 44 will also turn. On this shaft 44, at a point midway between the bars 5, a tripping lever 48 is secured between its ends. The ends of the lever 48 are made with sockets to receive studs 49 and set screws 50 are provided to securely lock these studs at various longitudinal adjustments, for a purpose which will hereinafter appear. These studs 49 have forked outer ends in which rollers 51 are mounted, and the rollers are moved through an arc of a circle, which will bring them into contact with the lower face of link 33, so that the tripping lever will, at regular intervals, elevate the link 33 and the choppers supported thereby, to lift the choppers over a small section of the cotton, and the choppers will fall to chopping position when the end of the lever 48 passes the link 33.

A cross rod 52 is secured in brackets 53 at the rear ends of bars 1, and two levers 54 are fulcrumed between their ends on this rod 52. The lower ends of the levers 54 are connected by links 55 with longitudinal bars 56, forming a part of my improved cultivator frames 57.

Notched links 58 are pivotally connected at one end to the bars 56 and are adapted to engage over studs 59 supported in brackets 60 secured to the rear ends of bars 5, and the notches in the links 58 permit the cultivator teeth to be held in operative position, and to be supported in an elevated position when the machine is moved from place to place.

The construction and operation of the cultivator is set forth in detail and fully covered in an application for patent filed herewith, and hence need not here be described in detail.

The operation of my improvements is as follows: As the machine is drawn over the ground, traction wheel 9 and sprocket wheel 11 transmit motion to sprocket wheel 29 and shaft 27, through the medium of sprocket chain 30. The pinion 26 on shaft 27 revolves pinion 25, which latter is connected to shaft 22 by the clutch 23, and through the medium of gears 21 and 20, shafts 18 are turned in opposite directions, as motion is transmitted from one shaft 18 to the other by the intermeshing gears 19. It will thus be seen that as the machine moves along the ground, the disks or colters 17 not only scrape, but also revolve and constitute in effect rotary mold boards to throw the dirt and cotton outward in the path of the cultivators behind.

As the machine is moved forward, the traction wheel 10 and sprocket wheel 12 turn sprocket 46, through the medium of sprocket chain 47, and continuously revolve shaft 44. As the shaft 44 revolves the tripping lever 48 is rotated and its ends alternately come into engagement with the under face of link 33. When the roller 51 at the end of the tripping lever engages the under face of link 33, it will move this link 33 upward, and through the medium of cross pin 36, chain 37, and hangers 14, will elevate the choppers so as to leave the desired quantity of cotton, and as the tripping lever passes the link 33, the choppers will fall to operative position.

By adjusting the studs 49 longitudinally in the ends of the tripping lever, the length of time the link 33 and the choppers are elevated can be regulated, and hence the amount of cotton left and the amount of cotton chopped out can be regulated to suit conditions.

By manipulating lever 24, the clutch 23 can be moved to throw the shaft 22 into and out of locked engagement with the driving pulley 25, and hence the shaft 16 and choppers 17 can be rotated or stopped at the desire of the operator.

With improvements of the character described, I am enabled to chop out the cotton, leaving the growing plants the desired distance apart, and the operation is entirely automatic, for when the machine is once adjusted, the choppers will be automatically elevated by the tripping lever 48, and the plants are exactly spaced an equal distance apart without relying upon the judgment of any one.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a cotton chopper, the combination with an approximately vertical transversely disposed rotary disk or colter, and automatic means for elevating said disk or colter at regular intervals.

2. In a cotton chopper, the combination with an approximately vertical transversely disposed rotary chopper, of a hand lever constructed to elevate the chopper, and automatic means for elevating the chopper at regular intervals.

3. In a cotton chopper, the combination with a pair of approximately vertical transversely disposed disks or colters, and means for elevating the disks or colters at regular intervals.

4. In a cotton chopper, the combination with a pair of approximately vertical transversely disposed disks or colters overlapping each other, and automatic means for elevating the disks or colters at regular intervals.

5. In a cotton chopper, the combination with a pair of approximately vertical transversely disposed disks or colters overlapping each other, means for revolving the disks or colters in opposite directions, and means for elevating the disks or colters.

6. In a cotton chopper, the combination with a supporting frame, of overlapping approximately vertical transversely disposed disks or colters, means for rotating the disks or colters, and a tripping mechanism adapted to elevate the disks or colters at regular intervals.

7. In a cotton chopper, the combination with a supporting frame, longitudinal parallel shafts having hinged mounting at their forward ends, approximately vertical transversely disposed disks or colters on said shafts, means for turning said shafts, and means for elevating the shafts.

8. In a cotton chopper, the combination with a supporting frame, of parallel longitudinal shafts having hinged connection at their forward ends, approximately vertical transversely disposed disks or colters secured on said shafts at their rear ends and overlapping each other, means for turning said shafts in opposite directions, and means for elevating the shafts.

9. In a cotton chopper, the combination with a supporting frame, of parallel longitudinal shafts having hinged support at their forward ends, approximately vertical transversely disposed disks or colters secured on the shafts at their rear ends and overlapping each other, means for turning said shafts in opposite directions and tripping means elevating said shaft at regular intervals.

10. In a cotton chopper, the combination with a supporting frame, of parallel longitudinal shafts having hinged connection at their forward ends, disks or colters secured on the rear ends of the shafts and overlapping each other, a hinged link connected with said shafts, a lever constructed to move this link to elevate the shafts, and a mechanically operated tripping lever movable in the path of the link and adapted to elevate the link and the shafts at regular intervals.

11. In a cotton chopper, the combination with a supporting frame, of parallel longitudinal shafts having hinged connection at their forward ends, disks or colters secured on the shafts at their rear ends, arms or hangers pivotally secured to the frame, and having bearings in which the shafts are mounted, a pivoted link at the upper portion of the frame, chains connecting said link with the respective bearings, a lever to move the link, and a mechanically operated tripping lever movable in the path of the link and adapted to elevate the link and the parts carried thereby at regular intervals.

12. In a cotton chopper, the combination with a supporting frame and a chopping disk or colter, of a link pivoted to the frame, flexible connecting means between the link and the disk or colter, a rotary shaft means for rotating the shaft by the movement of the chopper, a tripping lever secured between its ends on said shaft, and so mounted that its ends move through an arc of a circle in the path of the link to elevate the link at regular intervals.

13. In a cotton chopper, the combination with a supporting frame, and a chopping disk or colter, of a link pivoted to the frame, flexible connecting devices between the link and the disk or colter, a rotary shaft means for rotating the shaft by the movement of the chopper, a tripping lever secured between its ends on said shaft and movable in the path of the link, and means for adjusting the length of the tripping lever.

14. In a cotton chopper, the combination with a supporting frame and a chopping device, of a link, flexible connecting means between the link and the chopping device, a rotary shaft means for rotating the shaft by the movement of the chopper, a tripping lever secured between its ends on the shaft, studs adjustably secured in the ends of the lever, and rollers carried by said studs and movable through an arc of a circle in the path of said link to elevate the latter at regular intervals.

15. In a cotton chopper, the combination with traction wheels, and a frame supported by said wheels, of parallel longitudinal shafts having hinged connection at their forward ends, disks or colters secured on said shafts, means driven by one of said wheels to revolve the shafts, and means driven by the other of said wheels to elevate the shafts and the disks or colters at regular intervals.

16. In a cotton chopper, the combination with a supporting frame, of short parallel shafts supported in bearings on the frame, of longer parallel shafts connected by universal joints with the shorter shafts, disks or colters carried by said longer shafts, means for driving said shafts to rotate the disks or colters in opposite directions, and mechanically operated tripping means for elevating the longer shafts at regular intervals.

17. In a cotton chopper, the combination with traction wheels, of a frame supported by said wheels, of longitudinal parallel shafts having hinged connection at their forward ends, disks or colters secured on the shafts at their rear ends, means driven by one of the traction wheels to revolve the shafts, clutch mechanism to throw into and out of operation said driving means, tripping mechanism constructed to elevate the shafts at regular intervals, and said tripping mechanism operated by the other of said traction wheels.

18. In a cotton chopper, the combination with a supporting frame, of parallel longitudinal shafts having hinged mounting at their forward ends, disks or colters secured on the rear ends of said shafts, depending brackets on the frame, arms or hangers having bearings at their inner ends to receive the shafts and provided with a series of openings at their outer ends to permit the adjustment of the arms in the brackets, means for manually elevating said arms and the shafts, and means for automatically elevating said arms and the shafts at regular intervals.

19. In a cotton chopper, the combination with a supporting frame, of parallel longitudinal shafts having hinged mounting at their forward ends, disks or colters secured on the shafts at their rear ends, arms or hangers having rotary connection with the shafts, a link pivotally secured to the frame, a cross rod on the free end of the link, chains connecting the ends of the rod with the said arms or hangers, a bell-crank operating lever fulcrumed on the frame, a depending link on the lever located in a slot in the first mentioned link, and a cross pin on the lower end of the lever to engage below the first mentioned link and compel the shafts to be elevated when the lever is moved in one direction.

20. In a cotton chopper, the combination with a supporting frame, of parallel longitudinal shafts having hinged mounting at their forward ends, disks or colters secured on the shafts at their rear ends, arms or hangers having rotary connection with the shafts, a link pivotally secured to the frame, a cross rod on the free end of the link, chains connecting the ends of the rod with the said arms or hangers, a bell-crank operating lever fulcrumed on the frame, a depending link on the lever located in a slot in the first mentioned link, a cross pin on the lower end of the link to engage below the first mentioned link and compel the shafts to be elevated when the lever is moved in one direction, and automatic tripping means to engage said first mentioned link to elevate the same at regular intervals.

21. In a cotton chopper, the combination with a supporting frame, of parallel longitudinal shafts having hinged mounting at their forward ends, disks or colters secured on the shafts at their rear ends, arms or hangers having rotary connection with the shafts, a link pivotally secured to the frame, a cross rod on the free end of the link, chains connecting the ends of the rod with the said arms or hangers, a bell-crank operating lever fulcrumed on the frame, a depending link on the lever located in a slot in the first mentioned link, a cross pin on the lower end of the lever to engage below the first mentioned link and compel the shafts to be elevated when the lever is moved in one direction, an automatic tripping lever movable in the path of the link, and means for adjusting the length of the lever to time the length of its engagement with said link.

22. In a cotton chopper, the combination with a rotary chopping disk or colter, of a hinged link, flexible devices between the link and the disk or colter, a rotary shaft means for rotating the shaft by the movement of the chopper, a tripping lever secured between its ends on the shaft and having sockets in its ends, studs mounted in said sockets, rollers on said studs, set screws in the lever to engage the studs and secure them at any longitudinal adjustment, and said rollers movable in the arc of a circle in the path of the said link to elevate the latter at regular intervals.

In testimony whereof I have signed my name to this specification in the presence of two subscribing witnesses.

TAYLOR J. SMITH.

Witnesses:
M. O. ALEXANDER,
J. A. FITCH.